United States Patent

Seiffert et al.

[11] Patent Number: 6,041,044
[45] Date of Patent: Mar. 21, 2000

[54] CONTROL NETWORK AND CONFIGURATION METHOD THEREFOR

[75] Inventors: Jörg O. Seiffert, Aidlingen, Germany; Daniel F. Widmer, Langnau, Switzerland

[73] Assignee: International Business Machines Corporation, Armonk, N.Y.

[21] Appl. No.: 08/875,817

[22] PCT Filed: Jan. 19, 1995

[86] PCT No.: PCT/EP95/00191

§ 371 Date: Jul. 17, 1997

§ 102(e) Date: Jul. 17, 1997

[87] PCT Pub. No.: WO96/22644

PCT Pub. Date: Jul. 25, 1996

[51] Int. Cl.$^7$ ........................................... H04J 1/16
[52] U.S. Cl. ............................................. 370/254
[58] Field of Search ................................... 370/254, 346, 370/252, 464, 465, 400; 340/991; 342/457; 714/821; 375/222, 219, 220; 374/93.23, 106.01, 102.01, 102.02; 364/242.94, 274, 274.1, 274.2, 274.3, 274.5, 284, 284.4, 286, 286.1, 286.2; 709/227, 222, 223, 217; 706/48, 52, 916

[56] References Cited

U.S. PATENT DOCUMENTS

| 4,864,492 | 9/1989 | Blakely-Fogel et al. | 706/45 |
|---|---|---|---|
| 4,942,540 | 7/1990 | Black et al. | 709/228 |
| 5,526,357 | 6/1996 | Jandrell | 370/346 |

FOREIGN PATENT DOCUMENTS

| 0490624 | 6/1992 | European Pat. Off. |
|---|---|---|
| 9216895 | 10/1992 | WIPO . |

*Primary Examiner*—Dang Ton
*Attorney, Agent, or Firm*—Daniel E. McConnell

[57] ABSTRACT

A control network and a configuration method, therefor, is described wherein sensor and actuator elements are connected to configurable converters. These converters perform (in addition to any other converters which might be necessary to convert physical signals into network data, e.g. A/D conversion etc.) a conversion of sensor data in accordance with conditions provided externally. In a preferred embodiment the range of possible sensor data is compressed to one bit for each condition referring to this sensor element. The conversion is done prior to the transmission of that sensor data to other nodes, thereby reducing the network traffic significantly. The traffic is further reduced as each sensor elements transmits its current state only when the logical value of this state has changed. The described network is especially suitable for low bandwidth media with a high noise level, e.g., power lines and infrared radiation.

7 Claims, 4 Drawing Sheets

CONTROL NETWORK AND CONFIGURATION METHOD THEREFOR

The present invention relates generally to a configuration process for digital data transmission networks. More particular, the invention defines a network architecture comprising nodes with sensor elements and actor elements, and provides a method for configuring such a network architecture. Even more specifically, the invention relates to a control system, e.g., for buildings, configurable by a person with no programming skills.

BACKGROUND OF THE INVENTION

Numerous attempts are known to provide buildings and industrial sites with a reliable and easy to use control network for appliances such as switching loads in dependence of actual sensor values such as time, temperature, and intrusion detector. Whereas the construction of modems or transceiver for the various possible transmission media, for example, wireless transmission using infrared or radio frequency electromagnetic waves, twisted pair of cables, coaxial cables, and AC power lines and of secure and robust network protocols made significant progress during the last decade, the art still lacks a control network architecture which at least in principle can be installed, configured, and used by everyone. The prior art though providing some assisting tools to a skilled network administrator widely fails in this respect.

The U.S. Pat. No. 4,864,492 provides a system and method for applying a knowledge based expert system to the creation of configuration parameters individualized to the workstations of complex networks. The knowledge is used to provide a menu and control the selections available to the network administrator. Further references of the prior art relate to methods of graphical representation of the networks topology. U.S. Pat. No. 4,942,540 for example describes a way to create and select a communication path between a user's terminal and a destination terminal by selecting the communication parameters from a scrollable menu. Graphical representation of the terminals and path are depicted in response to different menu selections. The European patent application EP-A-0 490 624 provides a system and method of operation by which a network administrator can graphically depict a network by defining a multiplicity of nodes with respective hardware and operating systems characteristics, and can then define the protocols of the communication paths between the nodes, and based upon such network of nodes and communication paths constraints can thereafter generate configuration parameters for the various operating systems of the nodes, which typically are workstations or PCs. Obviously this approach to the problem of network configuration is not meant for other users than professional network administrators.

It is therefore an object of the invention to provide an intuitively useable method of network configuration, in particular for building control and automation.

The invention assumes the existence of a network for controlling a for example building, said network comprising single nodes. Each node carries at least one modem or transceiver for transmitting data over a transmission medium. Each node further comprises a read/write (r/w) memory for storing microcode and a microprocessor for executing the microcode stored in the memory. Within the network, each node has a node ID. The node ID allows to identify from reading a specific part of the transmitted data, e.g. a header section, the sending and/or receiving node. Generally, each node carries at least one sensor element or one actuator element. While basically the networks lying within the scope of the invention based on so-called peer-to-peer networking, further the existence of a special node with a user interface is assumed. This special node is designed to receive the input of a user or display and store information about the network and its nodes. As "peers" the nodes can after the network configuration communicate directly with each other without relying on the central node.

Networks of the above described type are known. An early example is published by N. McArthur et al. in "The intelligent plug", Wireless World, Dec. 1979, pp. 46–51. Another more recent network is described in the European patent application EP-A-0 393 117.

SUMMARY OF THE INVENTION

The invention is characterized by the features as set forth in the appended claims. It is in particular characterized in that a node of a control network further to comprising modem means for transmitting and/or receiving data over a transmission medium and at least one sensor element includes configurable converter means for converting output of said sensor element into digital data transmitted via said transmission medium, and means for storing externally provided configuration data for use by said configurable converter means, said configuration data being derived from externally provided control condition data referring to said sensor element. A node with actuator elements comprises the corresponding converter means to interpret the digital data sent by a sensor element and initiate the requested operation of the actuator element, It is an important aspect of the invention that network data traffic occurs in defined digital data format, i.e. a bit pattern. The bit pattern indicates whether a (current) value measured by a sensor element satisfies a condition or not. In a preferred embodiment of the invention, the bit pattern is reduced to the one-bit representation of TRUE and FALSE, i.e. "1" or "0", thereby restricting the data transmission over the transmission medium significantly. The data transmission is also reduced as a node does continuously transmit data to the network but only when the related condition changes its logical value from TRUE to FALSE or vice versa.

It might be instructive to regard this method as a mapping or compressed conversion of the total range of a sensor to a limited number of intervals each associated with a defined bit pattern. In contrast to conventional linear or logarithmic converters which convert an input value according to a fixed coding scheme into the respective output value, according to this invention, the coding scheme is dynamically allocated to a sensor element and adapted to the requirements or conditions externally provided by a user of the network. Ideally the network traffic is thereby reduced to "status reports" emitted from nodes carrying sensor elements and received by nodes with actuator elements. However, certain functions of the network, for example all application which depend upon the actual state of a sensor element, may require the continuous transmission of a (fixed) coded signal. The configuration process according to the invention provides sensor data which are independent from the specific (physical) nature of measured parameter and which can be combined arbitrarily for the purpose of controlling an actuator element.

The invention is particularly suitable for peer-to-peer control networks, as applied for example for controlling loads in buildings and industrial plants. It shows a significantly reduced network traffic and is thus preferably applicable to transmission media with a low bandwidth or throughput. Such media can be for example infrared light waves, ultrasonic waves, or AC power lines.

In a preferred embodiment, each condition referring to a sensor element (IF condition) is assigned to a specific bit position in the data string emitted from the node carrying this sensor element. If the range of this element is for example divided by the user's IF conditions into four intervals, four bit indicate whether the respective condition is satisfied.

The IF conditions may however be coded in accordance with other coding schemes, for example by binary coding. In this case four intervals would be coded by only two bits. It is obvious to a skilled person that the exact coding scheme can be chosen arbitrarily from known coding schemes.

A further aspect of the present invention is that each node carrying an actuator element the actions of which are controlled by the IF conditions of one or a plurality of sensor elements receives information about the bit pattern, the coded representation assigned to each of those IF conditions, together with their respective logical connections, i.e. the Boolean operations, e.g. "AND" or "OR", which combine single IF conditions. The third information loaded to the actuator node concerns the priority which comes into effect in case that a user's input contains inconsistent or contradictory IF conditions.

These and other novel features believed characteristic of the invention are set forth in the appended claims. The invention itself however, as well a preferred mode of use, and further objects and advantageous thereof, will best be understood by reference to the following detailed description of illustrative embodiments when read in conjunction with the accompanying drawings.

DESCRIPTION OF THE DRAWINGS

The invention is described in detail below with reference to the following drawings.

DETAILED DESCRIPTION

Figure 1:
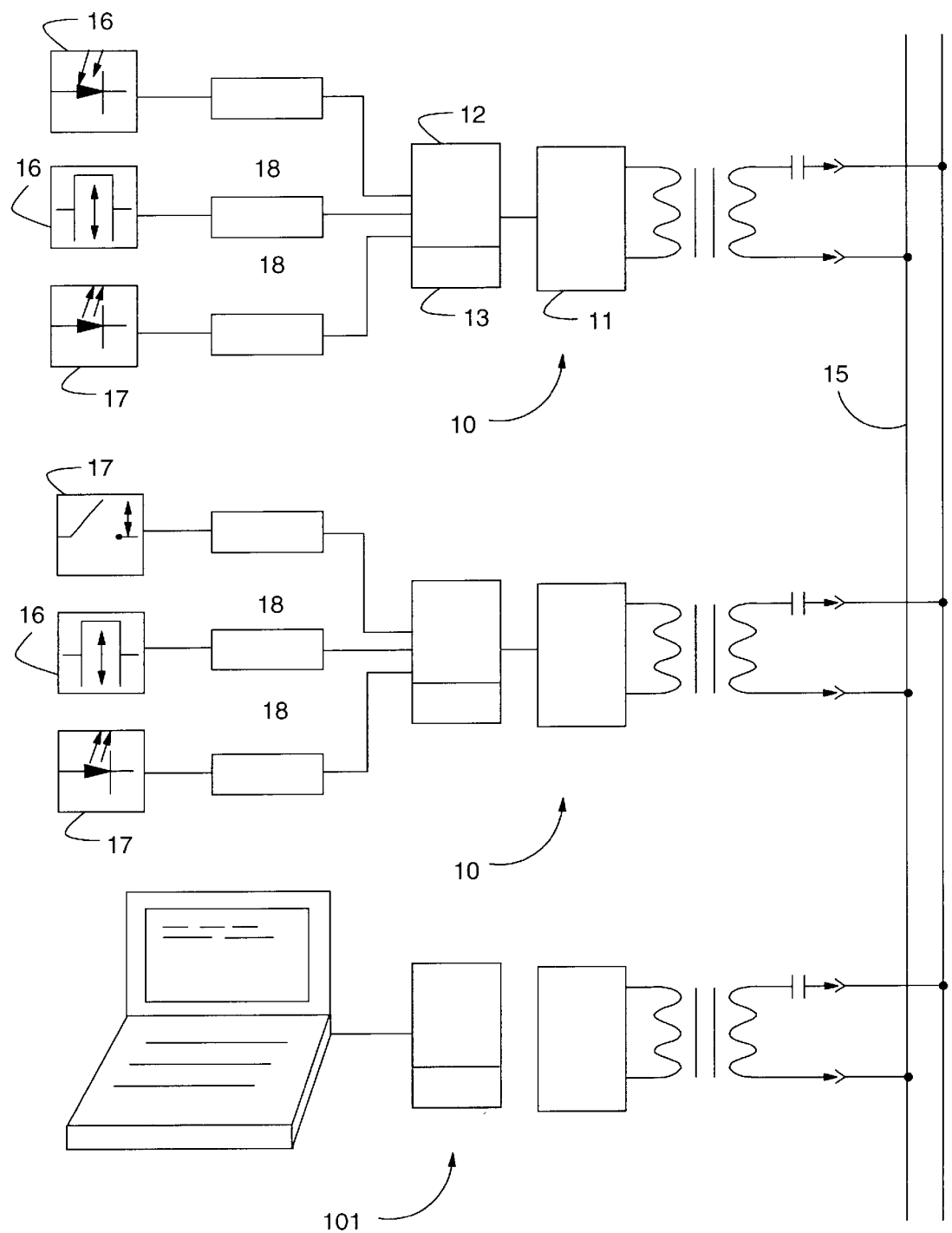
FIG. 1 shows a network including several nodes connected to the power lines of a building.

Referring firstly to FIG. 1, a network comprising several nodes 10 is shown. All nodes of the network include modem means 11 enabling a node controller 12 to transmit data to a transmission medium 15 in accordance with a control code which is stored during the configuration process in a memory 13 of each node. The transmission medium 15 of the described example are the power lines of a building. As however stated above, the current invention can be applied to any transmission medium. Further components of a node comprise sensor elements 16 and actuator elements 17, whereby each node may include any combination of these elements. The sensor and actuator elements are connected to suitable converter means 18 which operate according to a fixed conversion scheme which is not altered during the installation and configuration of the network itself. Examples for these known converters are A/D and D/A converters, F/D and D/F converters, and the like. One of the node 101 also includes means for running programs and an interface for communication with a human operator or user. This particular node will be in the following referred to as Administrator or A-node. In the described example, the A-node is a Personal Computer (PC) having a board which carries the modem means and all other components necessary to let the PC communicate as node within the network. It will become apparent that in spite of the existence of a particular node, i.e., the A-node, the described network truly belongs to the class of peer-to-peer networks. In the operation mode of the network, after the configuration process is terminated, the A-node becomes indistinguishable from other nodes in the network.

The first step of building the network includes identifying each installed node of the network to the A-node. This identification process may be performed by several methods. In the example, a configuration program installed in the A-node includes a library of predefined node types. Upon installation of a new node, a signal is generated which allows the A-node to identify the type of node including all its sensor and actuator elements together with a node ID, i.e. an address which allows to individually communicate with the newly installed node.

Figure 2:
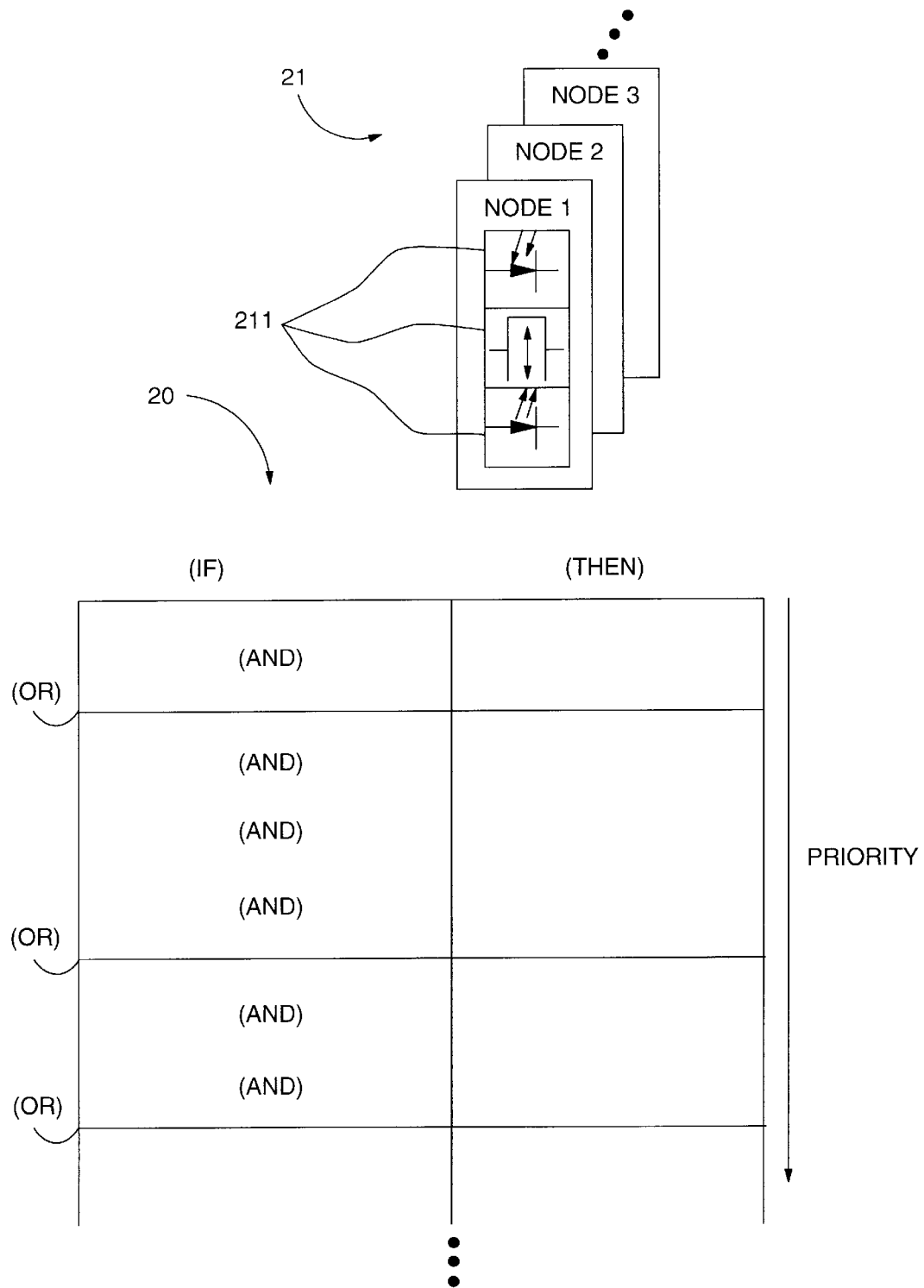
FIG. 2 shows details of a screen display as occurring during a configuration process in accordance with the invention.

After all nodes of the network are installed and identified as types of nodes stored in the library, a two-column table 20 as shown in FIG. 2 is generated on a display of the A-node. The A-node further comprises means which interpret all statements typed by the user into the first column as IF statements and all entries to the second column as THEN statements. In addition all statements to one field of the IF column are treated as being connected by AND and statements in two different fields as being connected by the Boolean OR operator. The configuration process forces the user to insert to the first column only statements which are related to sensor elements and to the second column only those entries which are related to actuator elements. The available elements 211 are displayed for each node as a group 21 of icons under the user defined name of the node. The unexperienced user can create entries to the table by dragging and dropping the desired icon 211 of an element into a field of the table 20 by using a pointer (mouse). After the drag and drop operation, the user will be prompted for further details of the condition to be defined.

Upon completion of the table entries in accordance with the desired network configuration and control parameters, the A-node generates all necessary configuration data and sends them to the other nodes in the network. The precise method will be in the following described with reference to a simple case. It should be noted that the precise method (e.g. the definition of the variables) may be readily altered by a person skilled in the art.

In the described example, the library provides for each sensor element a STATE_DEF variable. In case of a brightness sensor element, the variable definition in C language is

```
typedef struct {
    SNVT_lux         threshold1;
    SNVT_lux         threshold2;
    char             logic;
    SNS_MATRIX       snsMatrix;
}
BGT_STATE_DEF;
```

The definition allows a user to define two thresholds. The threshold values can be regarded as representing the value as measured by the brightness sensor. It should be noted that the actual format of these measured value in the network depends on fixed translations and formatting operations (e.g. an A/D conversion) which may differ in different network environments and/or with different types of sensors. However these formats, hereinafter also referred to as "uncoded formats" are not concern of the current invention. A third, character type variable denotes the relation between the two thresholds, e.g. equal, greater than, smaller than, etc., the values of which are predefined by the object library and assigned according to the user input. The SNS_MATRIX variable, defined as

```
typedef struct {
    unsigned    outSNSStIndex :2;    /* row position */
    unsigned    outStatePos :6;       /* bitpos in STATE NV*/
}
SNS_MATRIX;
``` holds a bit position in the matrix build by the combined payloads of all transmitted network variables of one node. Details concerning these network variables are described below.

In case a user wants the brightness sensor to control several appliances or the same actuator element under different conditions, a number of BGT_STATE_DEF variables are defined.

The information residing in the STATE_DEF variables is combined for each sensor element in configuration variable, which is in case of the brightness sensor defined as allocation step to the sensor elements of the node. With this allocation step each sensor element is given a maximum number of possible states which correspond to the maximum number of statements a user may assign during the configuration process as described above to any of the sensor elements. In essence, a fixed number of bits in the payload of the NVs is reserved for each sensor element.

Though both allocation steps are in the present example static, i.e., defined before the actual configuration process, the invention contemplates also at each level a dynamic allocation of resources depending on the user's desired configuration. In this variant, either network variables are assigned to a node depending on the number of statements referring to this node or bit positions in the payload of NVs assigned to a node are reserved only for statements actually defined by the user. Its an obvious advantage of the dynamic allocation scheme that resources are more economically exploited than by a static allocation. This advantage is however balanced by more complex and time consuming administrating operations.

Returning now to the description of preferred embodiment of the invention and the treatment of entries to the second column of the table, it is remembered that those entries, the THEN statements define states of actuator elements in the nodes. The user input in this column are transformed into configuration variables. The configuration variable for controlling a power switch is for example defined as

```
typedef struct {
    uSHORT8          noStates;                     /* no of defined states at all */
    BGT_STATE_DEF    stateDef[SNS_BGT_STATE_MAX];
    SNS_DEFECT       snsDefect[SNS_ST_MAX];        /* state: sensor defect */
    uSHORT8          updateTime;                   /* time to update sensor */
}
SNS_BGT_CFG;.
```

The configuration variable includes further to the STATE_DEF variables information about handling a sensor defect message and information concerning the time period after which a new value is transmitted by the sensor (update period).

Referring now to the role of the above-mentioned network variables (NV), some physical restrictions of the control network have to be considered. As the invention especially is designed for transmission media with a low bandwidth and a high noise level, the amount of network traffic is restricted and has to be administrated accordingly. In a first step of allocating network resources to the nodes, each node which is identified in the installation step described above is associated with a finite number of network variables (NVs). A network variable is a string of data effectively acting as a container which is characterized by either a starter bit sequence (header) or a stop bit sequence (tail) or a combination of both. In addition to these bits, the network variable carries either a fixed or a variable number of bits which represent the information to be transmitted, i.e. data which according to well established communication terminology is denoted by the term "payload". Examples of NV can be found in FIG. 3B.

The payload assigned in form of a finite number of NVs to each node within the network is assigned in a second

```
typedef struct {
    uSHORT8       ruleDefNr;    /* Number of defined rules (<= RULES_MAX) */
    RULE_DEF      ruleDef[ACT_230_RULE_MAX];   /* rules */
    SNVT_lev_disc idleState;
}
ACT_230_CFG;
``` which includes a number representing the number of statements defined by the user which refer to this power switch (said number being checked against the maximum number allocated to the power switch during the initialization process), and the defined states themselves. The states denoted by RULE_DEF:

```
typedef struct {
    unsigned    inACTStIndex :6;   /* sensor position in nviActST[]*/
    unsigned    invInState :1;     /* 1 = Invert, 0 = don't invert */
    unsigned    logicRule :1;      /* 0 = _AND , 1 = _OR */
    unsigned    inStatepos :6;     /* bitpos in STATE nvi(left to right) */
    unsigned    stateAct :2;       /* 0 = _ST_OFF, 1 = ST_ON, 2 =
```

-continued

```
ST_INV */
    SNS_DEFECT    snsDefect;
}
RULE_DEF;
``` includes the desired state (stateAct) which in the case of the switch may either be ON, OFF, or CHANGE, represented by 0, 1, or 2, respectively. RULE_DEF further includes variables (inACTStlndex and inStatePos) which indicate a bit position in the payloads or matrix of the combined payloads of received network variables (NVs) and a variable (logicRule) which determines the logical operation to be performed with the bit found at the indicated bit position of the NV and the following bit as indicated by the next RULE_DEF related to this actuator element. In case that logicRule is set to "AND", the stateAct can be left unassigned as the actuator operation is only performed after evaluation of the following RULE_DEF. Only when an OR is encountered as logicRule value, the operation defined by stateAct is executed if the conditions as set by all previous RULE_DEFs connected by an AND operator are fulfilled. The following RULE_DEFs whether grouped by AND operators or not and relating to the same actuator element are then ignored. If not, the following RULE_DEF or group of RULE_DEFs is processed accordingly.

After evaluating the above-described variables, those STATE_CFG and ACT_CFG variables associated with the 'sensor elements and actuator elements of one node are combined to one CFG variable.

```
typedef struct {
    SNS_BGT_CFG  snsBgtCfg;   /*BrightSensor Configuration */
    SNS_PSH_CFG  snsPshCfg;   /*PushButton Sensor Config */
    ACT_230_CFG  act230Cfg;   /*Power relay Configuration */
}
CFG;
``` describes for example the CFG variable for a node which includes as sensor elements one brightness sensor and one push button and as actuator element one power line switch, e.g. a relais. When the CFG data which are generated by the A-node are transmitted to all nodes and loaded into their local micro-controller memory, the coding as being bases of the invention is essentially completed. To be however fully operable as a control network, those NVs which contain information about the status of an sensor element have to be addressed to those nodes which carry the actuator elements which are controlled by the status of said sensor element. The task of addressing single nodes in a network can be carried out using different method which are known in principle to a skilled person. In the network of the example, the NVs assigned to a node are identified by a individual header. The node which comprises an actuator element is instructed to receive all NVs containing relevant sensor data in a process which may be referred to as "binding" or connecting.

In the following, the operations of a network configured in accordance to the example described above is set forth in. further detail assuming a scenario in which the user wants a power relay of a node 1 to be switched off when the brightness as measured by the brightness sensor of a node 2 exceeds a threshold of 30000 Lux and when simultaneously the push button of node 2 is in an "ON" position. When the measured brightness lies within a range of 0 to 20000 Lux, the power relay should be activated also only when the push button of node 2 is in an "ON" position. It is finally assumed in the scenario that the user wants the measured brightness values to be continuously displayed on the display of the A-node.

In the installation step, node 1, having a power switch, and node 2, which includes the brightness sensor and the push button, are connected to the power line by simply plugging them into outlets thereof. Each node exchanges an initialization sequence with the activated A-node which is also connected to the same power line. The A-node compares the initialization sequence of each node with entries in its node library and generates a node object representing information about the node, its sensor or actuator elements, the allowed states and maximum number, thereof, and the network variables (NVs) assigned to the node. Simultaneously, a graphical representation or icons of each node and its elements, as shown in FIG. 2, is generated allowing the user to use a mouse type pointing and control device during the following configuration step.

Figure 3A:
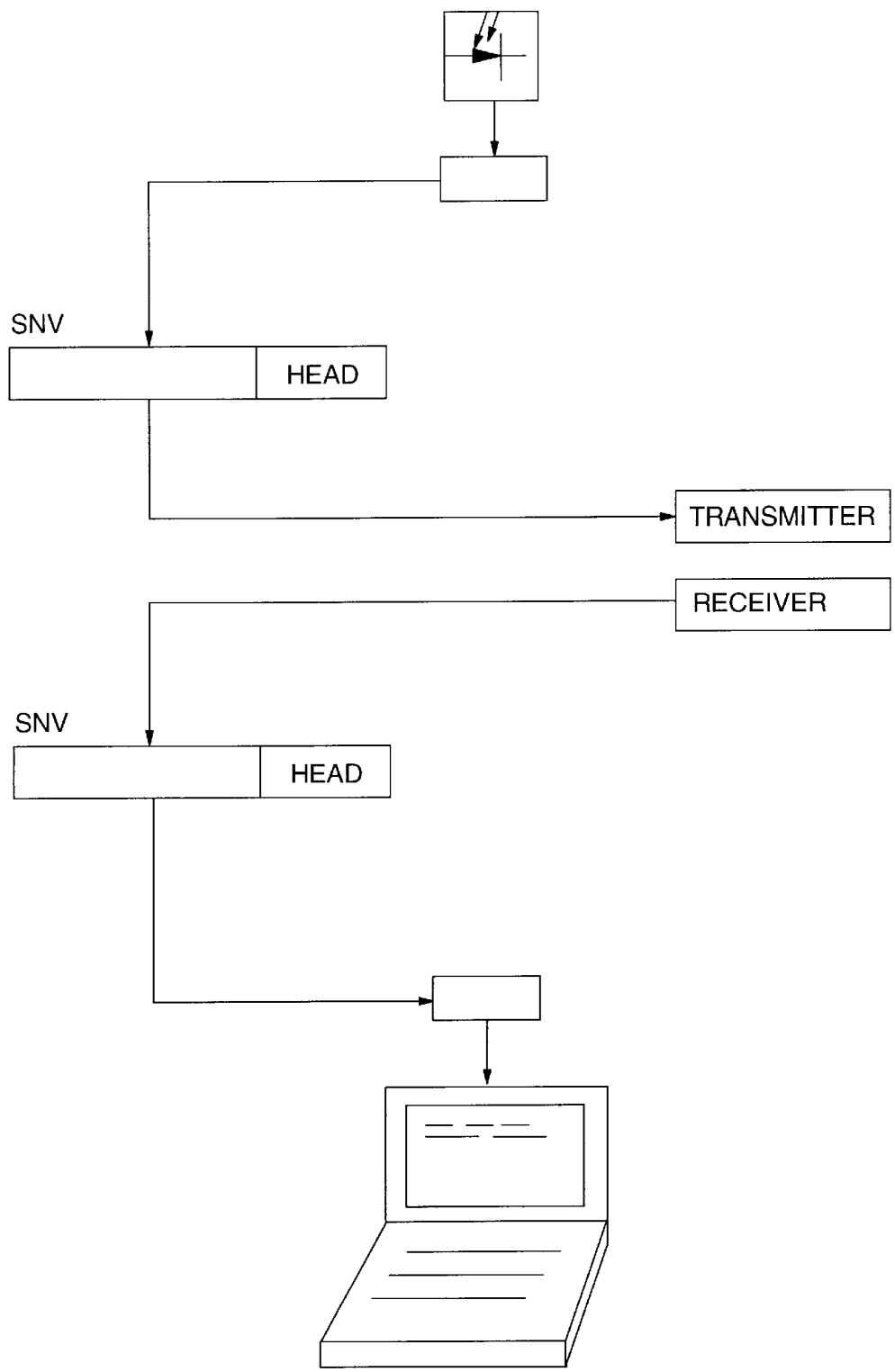
FIG. 3A shows details of a data transmission in known control networks
Figure 3B:
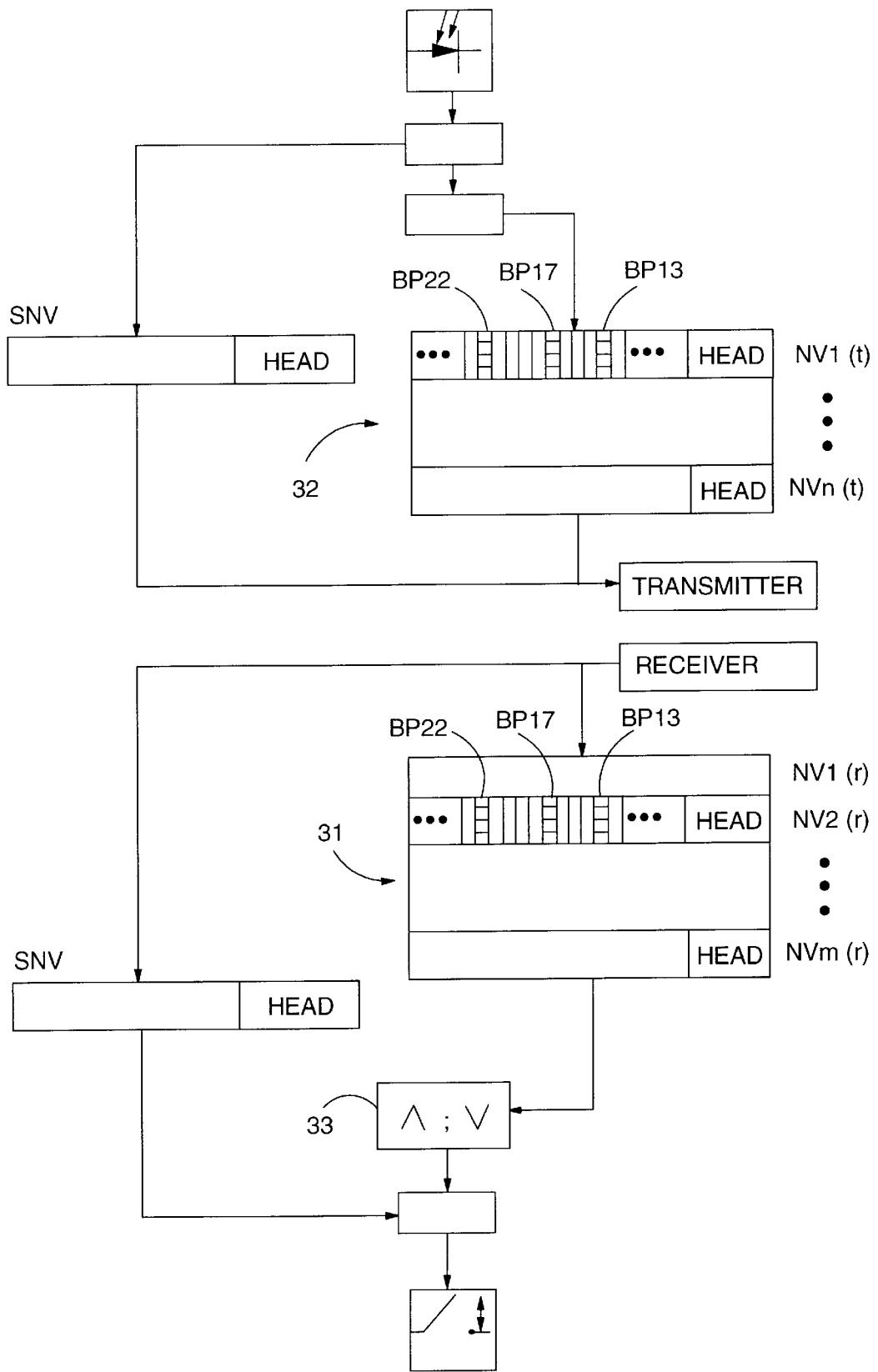
FIG. 3B shows details of a data transmission in accordance with the invention.

The configuration system let the user choose between a monitor mode and a configuration mode. As not being a prevailing concern of the invention, the monitor mode is described first: upon selection of the brightness sensor icon of node 2, the user is essentially prompted for the time interval at which a measurement should be displayed. The configuration system then identifies a specific network variable (SNV) the payload of which contains solely the uncoded format of the brightness value as defined above. Further, the time intervals at which node 2 generates and transmits the SNV is set in accordance to the user input. The A-node is instructed to receive this SNV and display the brightness value after suitable conversion operations. The value may also be transferred and stored directly as data suitable for further processing with a spreadsheet program or the like. The processing of the SNV is schematically illustrated by FIG. 3A. As stated above, the generation and processing of uncoded format data is not a particular concern of the invention.

In the configuration mode, which is seen as important element of the invention, the configuration system generates the table 20 shown in FIG. 2. Using the mouse, the user may now drag the sensor elements 211 in accordance with the above-described scenario into fields of the first columns. To generate the first operation mode or conditions as described in the scenario, it is sufficient to drag the brightness sensor icon into the first field of the IF column of the configuration table and when prompted for the threshold values to fill in 30000 Lux as one threshold. Further a GREATER THAN is selected. The push button icon of node 2 is dragged into the same field, whereupon the configuration system automatically construes an "AND" relation between both sensor element states. The user can define the push button as logical switch and sets its value to ON. Then the power switch element of node 1 is dragged into the neighboring field of the THEN column of the configuration table and defined as OFF. To configure the second operation mode, again the brightness sensor element of node 2 is dragged into the next field of the IF column of the configuration table, setting the threshold values to 0 Lux and 20000 Lux, respectively. These values are related by a SMALLER THAN and a SMALLER THAN OR EQUAL to the measured value. The push button icon of node 2 is again dragged into the same field, whereupon the configuration system automatically construes an "AND" relation between both sensor element states as above. Dragging and configuring of the power switch element is also repeated as described above and set to ON.

After completion of these steps, the configuration system is enabled to generate and transmit two CFG type messages, wherein the CFG messages assigned to node 1 contains a ACT_230_CFG message. The CFG message for node 2 contains a SNS_BRIGHT CFG and a SNS_PSH_CFG message. The ACT_230_CFG contains four RULE_DEFs as defined above, and the SNS_BRIGHT_CFG contains two BGT_STATE_DEFs, and the SNS_PSH_CFG one PSH_STATE_DEF.

In the first BGT_STATE_DEF the value of SNVT_lux is set to 30000 and the char variable is set to "GREATER THAN". The SNS_MATRIX is set to a non-assigned bit position BP22 of the payload of the network variables 32 assigned to node 2. The bit position is assumed to be the 22nd bit of the first transmitted network variable NV1(t). Hence, outSNSStlndex is set to "1" pointing to NV1(t), and outStatePos is set to "22". The second BGT_STATE DEF contains the threshold values 0 and 20000 and char is set to "R" indicating a range relation (0<measured value<=20000). The SNS_MATRIX points to bit position BP13 of the payload of NV1(t). The SNS_PSH_CFG contain one PSH_STATE_DEF in which the char variable is set to "1", indicating a switch function of the push button. A bit position within the payload of NV1 is defined by SNS_MATRIX (as BP17).

In the first RULE_DEF, the bit indicator (inACTStlndex, inStatePos) points to the first above assigned bit of the brightness sensor (bit position BP22) of the second network variable NV2(r) received by node 1. Under the conditions of the current scenario is NV2(r) equals NV1(t), i.e., the first NV transmitted by the node 2. The value of inACTStlndex is set to "2" and inStatePos is set to "22". The value of logicRule is set to "AND". The bit indicator of the second RULE_DEF points to bit position BP17, i.e. the switch position. The logicRule is set to "OR". The stateAct variable is set to "ST-OFF".

In the third RULE_DEF, the bit indicator (inACTStlndex, inStatePos) points to the second assigned bit of the brightness sensor (BP13) of the second received network variable NV2(r). The value of logicRule is set to "AND". The bit indicator of the fourth RULE_DEF points to bit position 17, i.e. the switch position. The logicRule is set to "OR". The stateAct variable is set to "ST_ON". The logicRule values are also stored as part of the configurable converter 33.

In the described scenario, use has been made of only one network variable, i.e., NV1(t)=NV2(r). In a more general case however each node carrying sensor elements has several NVs available for writing in bits defining sensor states. Same applies to node having actuator elements with respect to the number of incoming or received NVs. In this case, all outgoing or transmitted NVs of a node is regarded as matrices 32, the rows of which are the NVs and the columns of which are bit positions. Same applies to the received NVs. A row of the matrix 32 of transmitted NVs thus appears as a row (albeit at a different row position) within a matrix 31 of received NVs. The configuration process derives for each actuator elements the matrix positions of all sensor states referring to this actuator element.

A simple control circuit can be implemented by means provided by the invention as follows. A "tooDark" brightness sensor state (<20000 Lux) is defined and related to actuator state "increase", which increases the power supply to a light source. A "tooBright" state is analogously defined (>50000 Lux). The default state of the actuator element is set to "STOP", freezing the current amount of power supply. The range between 20000 Lux and 50000 Lux forms a control hysteresis, which prevents oscillations of the control circuit. As is easily seen, this configuration enables a feedback control of the brightness in a room or building.

We claim:

1. Apparatus comprising:
    a modem which exchanges data over a transmission medium;
    a sensor element;
    a configurable converter operatively interconnecting said modem and said sensor element and converting output of said sensor element into digital data which indicates whether a value measured by said sensor element satisfies a condition or not and which in to be transmitted via said transmission medium by said modem; and =p1 a memory which stores externally provided configuration data for use by said configurable converter in performing the conversion, the configuration data being derived from externally provided control condition data referring to said sensor element.

2. Apparatus according to claim 1 further comprising an actuator element operatively connected with said configurable converter means operatively connected with said converter and operating in response to the digital data and wherein said memory stores configuration data derived from externally provided control condition data referring to said actuator.

3. Apparatus according to claim 2 further comprising a plurality of sensor elements transmitting data relating to said actuator element and wherein said configurable converter comprises logic elements which manipulate data transmitted from said plurality of sensor elements by logical operators (AND,OR), said logical operators which are also derived from externally provided control condition data referring to said actuator element.

4. Apparatus according to claim 1 wherein said converter reduces digital data transmitted after conversion from the output of said sensor element to one bit for each externally provided control condition data referring to said sensor element.

5. Apparatus according to claim 1 wherein said configurable converter comprises a microprocessor and further comprising microcode stored in said memory accessibly to said microprocessor, said microprocessor when executing said microcode controlling the conversion of the output from said sensor.

6. A method comprising the steps of:
    receiving as externally provided control condition data:
        IF information relating to a predetermined state of a sensor element;
        THEN instructions relating to a predetermined operation of an actuator element;
        logical information defining the relationships among any plurality of IF instructions received;
        priority information concerning the sequence in which any plurality of THEN instructions are to be executed; and
        link information relating to a plurality of nodes which are to exchange data through a transmission medium;
    extracting the received control condition data;
    converting the extracted data into configuration data; and
    loading the configuration data into a memory accessible to a configurable converter which receives data from one of a sensor element and an actuator element, converts the received data into a digital signal using the configuration data, and transmits the digital signal over the transmission medium via a modem.

7. The method of claim 6 wherein a configuration table is generated for pre-formatting the externally provided control condition data, the table essentially having one IF column for entries relating to predetermined state of sensor elements and one THEN column for entries relating to predetermined operations of actuator elements, and wherein entries too one field of said IF column are connected by a logical AND operation and entries into separate rows of said table are connected by a logical OR operation.

* * * * *